United States Patent [19]

Hovan

[11] Patent Number: 4,574,584
[45] Date of Patent: Mar. 11, 1986

[54] METHOD OF OPERATION FOR A GAS TURBINE ENGINE

[75] Inventor: Edward J. Hovan, Manchester, Conn.

[73] Assignee: United Technologies Corporation, Hartford, Conn.

[21] Appl. No.: 738,630

[22] Filed: May 28, 1985

Related U.S. Application Data

[62] Division of Ser. No. 564,996, Dec. 23, 1983.

[51] Int. Cl.[4] ................................................ F02C 7/12
[52] U.S. Cl. .................................... 60/39.02; 60/39.07; 60/39.08; 60/39.83; 415/170 R; 415/175; 184/6.11
[58] Field of Search .............. 60/39.02, 39.08, 39.83, 60/39.07; 415/111, 112, 170 R, 170 A, 175, 176, 177; 184/6.11; 277/22; 384/320, 139, 143, 142

[56] References Cited

U.S. PATENT DOCUMENTS

| | | | |
|---|---|---|---|
| 2,886,133 | 5/1959 | Mauck et al. | 60/39.08 X |
| 3,378,104 | 4/1968 | Venable | 60/39.08 |
| 3,527,054 | 9/1970 | Hemsworth | 415/111 |
| 3,884,041 | 5/1975 | Zerlauth | 60/39.08 X |
| 4,046,223 | 9/1977 | McHugh | 60/39.08 X |
| 4,153,141 | 5/1979 | Methlie | 184/6.11 X |
| 4,254,618 | 3/1981 | Elovic | 60/39.75 X |

FOREIGN PATENT DOCUMENTS

1095129  12/1967  United Kingdom .

Primary Examiner—Louis J. Casaregola
Assistant Examiner—Jeffrey A. Simenauer
Attorney, Agent, or Firm—Gene D. Fleischhauer

[57] ABSTRACT

A cooling system 46 for a turbofan gas turbine engine 10 is disclosed. Various construction details which increase the effectiveness of a heat exchanger 70, 76, 112 are disclosed. In one embodiment, a rotor shaft 98 is used to pressurize buffer air for a bearing compartment 40.

5 Claims, 7 Drawing Figures

OIL/AIR MIXTURE AUTO IGNITION WITH PRESSURE & TEMPERATURE CHANGES

METHOD OF OPERATION FOR A GAS TURBINE ENGINE

CROSS REFERENCE

This is a division of application Ser. No. 564,996 filed on Dec. 23, 1983.

This patent application is related to the subject matter in U.S. patent application Ser. No. entitled "Air Cooler For Providing Buffer Air To A Bearing Compartment" filed on even date herewith by Edward J. Hovan and Joseph P. Zimonis Ser. No. 564,995; U.S. patent application Ser. No. 499,634 entitled "Bearing Compartment Protection System" filed on May 31, 1983 by Robert L. Putnam; and U.S. patent application Ser. No. 499,633 entitled "Bearing Compartment Protection System" filed on May 31, 1983 by Leonard W. Stevens, William S. Siwik, William A. Moore, Wayne M. Brown and Andrew A. Barnard. All of the above applications are assigned to the assignee of this patent application.

DESCRIPTION

1. Technical Field

This invention relates to gas turbine engines and more particularly to a method for operating the engine and to an apparatus which enables the ducting of a high temperature, high pressure fluid through a cavity on the interior of the engine that contains a bearing compartment. The present invention was developed for axial flow gas turbine engines and has application to other fields.

2. Background

An axial flow gas turbine engine includes a compression section, a combustion section and a turbine section. A flow path for working medium gases extends axially through the sections of the engine. As the gases are flowed along the flow path, the gases are compressed in the compression section and burned with fuel in the combustion section to add energy to the gases. The hot, pressurized gases are expanded through the turbine section to produce useful work and thrust.

A rotor in the turbine section has a rotor assembly for extracting useful work from the hot, pressurized gases. The rotor assembly includes at least two stages of rotor disk-blade assemblies. The rotor has a rotor shaft which connects these stages to another rotor assembly in the compression section to provide work to the compression section for compressing the working medium gases. A stator extends axially through the engine to circumscribe the rotor and to support the rotor through a bearing which is generally disposed in a bearing compartment. The bearing compartment is located in an inner cavity of the engine.

As the working temperatures and pressures of the engine are increased in modern engines, it has become necessary to provide pressurized cooling air to those rotor stages in the turbine that are closest to the discharge region of the combustion section.

A convenient flow path for providing cooling air to the second rotor assembly lies through the inner cavity containing the bearing compartment. Cooling air at a pressure high enough for use in the turbine section is ducted from a rear stage of the compressor. The temperature of the air is low in comparison to the turbine section, which is good for cooling, but high in comparison to the interior of the bearing compartment. Because of the high pressure needed for the turbine, this "cooling" air has caused problems in the bearing compartment. The hot air forces its way past the seals in the bearing compartment. The leakage of the hot pressurized gases past the seals into the bearing compartment is often accompanied by severe thermal distress resulting from small pockets of autoignition adjacent the seal region. As it turns out, earlier methods of operating bearing compartments avoided this problem of severe thermal distress by venting the bearing compartment to a very low pressure. Venting is no longer feasible because of the inability of known sealing means in the bearing compartment to maintain their integrity in the face of large pressure differentials which must occur in current engines to supply cooling air to the turbine section at the correct pressure. Cooling all of the air flowed through the inner air cavity would solve this problem providing the pressure was maintained at suitable levels; but this is not feasible because of the large penalty in performance that accompanies the cooling of this air both in terms of parasite power and unavailable energy.

Accordingly, scientists and engineers are searching for methods of supplying hot pressurized air to a rotor assembly through the inner cavity in a way and with structure that prevents severe thermal distress in adjacent bearing compartments.

DISCLOSURE OF INVENTION

According to the present invention, a gas turbine engine having a bearing compartment disposed in a fluid cavity through which a first fluid is flowed, includes a duct for flowing a fluid at a lower temperature to the seal region of the bearing compartment.

In accordance with one embodiment of the present invention, the duct is adjacent to the bearing housing to transfer heat from the fluid being cooled to the interior of the bearing compartment.

According to the present invention, a method for operating a gas turbine engine includes the steps of flowing a high temperature, high pressure cooling fluid for an even higher temperatured rotor blade through an inner cavity of the engine adjacent a bearing compartment; pressurizing the bearing compartment having a quench time characteristic to a pressure in excess of one hundred psia which decreases the difference in pressure between the bearing compartment and the inner cavity to less than a predetermined amount; ducting a cooling fluid to a buffer region adjacent the seals of the bearing compartment, the cooling fluid having a autoignition characteristic which is greater than the quench time characteristic of the bearing compartment. In accordance with one embodiment of the present invention, the autoignition time characteristic is greater than the residence time characteristic for the oil/air mixture in the bearing compartment.

A primary feature of the present invention is an inner cavity of an engine containing a bearing compartment through which is flowed a high pressure high temperature fluid. Regions adjacent the seal means for the bearing compartment are in flow communication with a source of high pressure cooled air. A feature of one embodiment of the invention is a duct in flow communication with the regions for supplying the high pressure cooled air adjacent the seal means, the duct being in heat transfer communication with the interior of the bearing compartment. A feature is the rotating shaft which bounds the inner cavity and supplies pressurized air to the duct.

A primary advantage of the present invention is the ability to flow a high pressure, high temperature fluid through an inner cavity having a bearing compartment disposed herein. Another advantage is the durability and efficiency of an engine which is operated at high pressures and high temperatures and yet is able to provide pressurized cooling air to the second stage rotor blade of such an engine. Still another advantage is the engine efficiency which results from using already pressurized air in the inner cavity to supply the air to the duct in the transfer communication with bearing compartment.

The foregoing features and advantages of the present invention will become more apparent in the light of the following detailed description of the best mode for carrying out the invention and in the accompanying drawing.

BEST MODE FOR CARRYING OUT THE INVENTION

Figure 1:
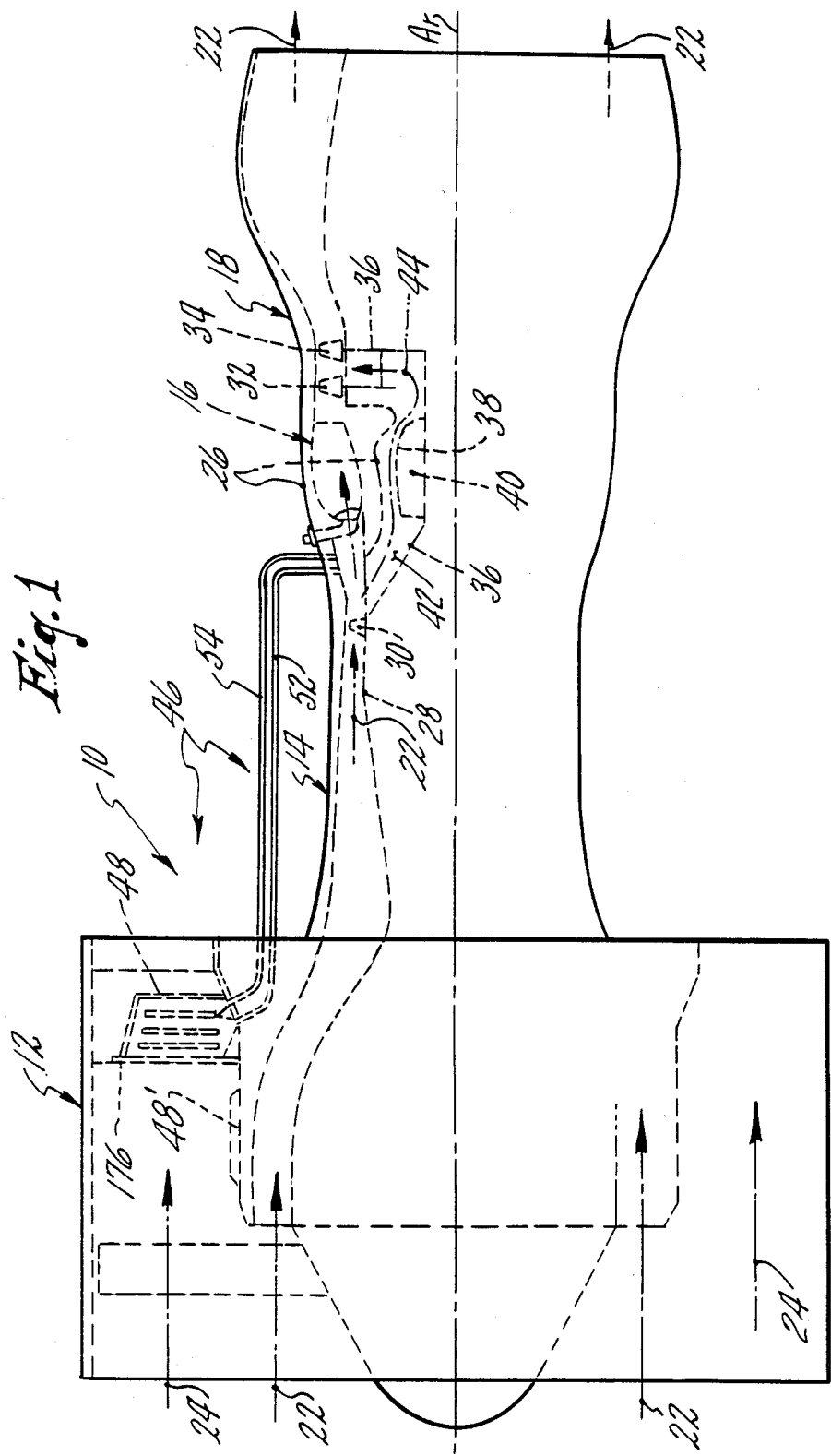
FIG. 1 is a side elevation view of a turbofan gas turbine engine with selected interior portions of the engine shown by dotted lines and flow paths shown by arrows.

FIG. 1 is a side elevation view of a turbofan gas turbine engine 10. The engine has an axis of rotation $A_r$. The engine includes a fan section 12, a compressor section 14, a combustion section 16 and a turbine section 18. An annular flow path 22 for primary working medium gases extends axially through these sections of the engine. An annular flow path 24 for secondary working medium gases is radially outwardly of the primary flow path working medium gases. The secondary flow path extends axially through the fan section of the engine.

As shown by the dotted lines, a stator assembly 26 extends axially through the engine to bound the working medium flow paths and to support rotating components such as the rotor assembly 28. The rotor assembly bounds the working medium flow path 22 and extends axially through the compression section and the turbine section of the engine. The rotor assembly has rotor stages having rotor blades which extend radially outwardly across the working medium flow path, as represented by the rearmost rotor blade 30 in the compressor and by the first and second stage rotor blades 32, 34 in the turbine.

A rotor shaft 36 extends axially to connect the rearmost rotor stages in the compressor and the first and second stages in the turbine. A bearing (not shown) extends between the stator assembly and the rotor shaft to support the shaft. A bearing housing 38 extends circumferentially about the rotor shaft to house the bearing in a bearing compartment 40. An annular cavity 42 outwardly of the rotor shaft adapts the engine to receive the bearing compartment.

A flow path 44 for cooling air for the second rotor stage 34 extends axially through the annular cavity 42. A cooling system 46 for providing pressurized air to the bearing compartment includes a heat exchanger 48 disposed in the fan section of the engine. A first duct 52 extends from a rear stage of the high pressure compressor for flowing hot, pressurized air to the heat exchanger. A second duct 54 extends from the heat exchanger for flowing cooled, pressurized air to the bearing compartment 38. A portion of the duct 54 in the region of the bearing compartment is broken away for clarity.

Figure 2:
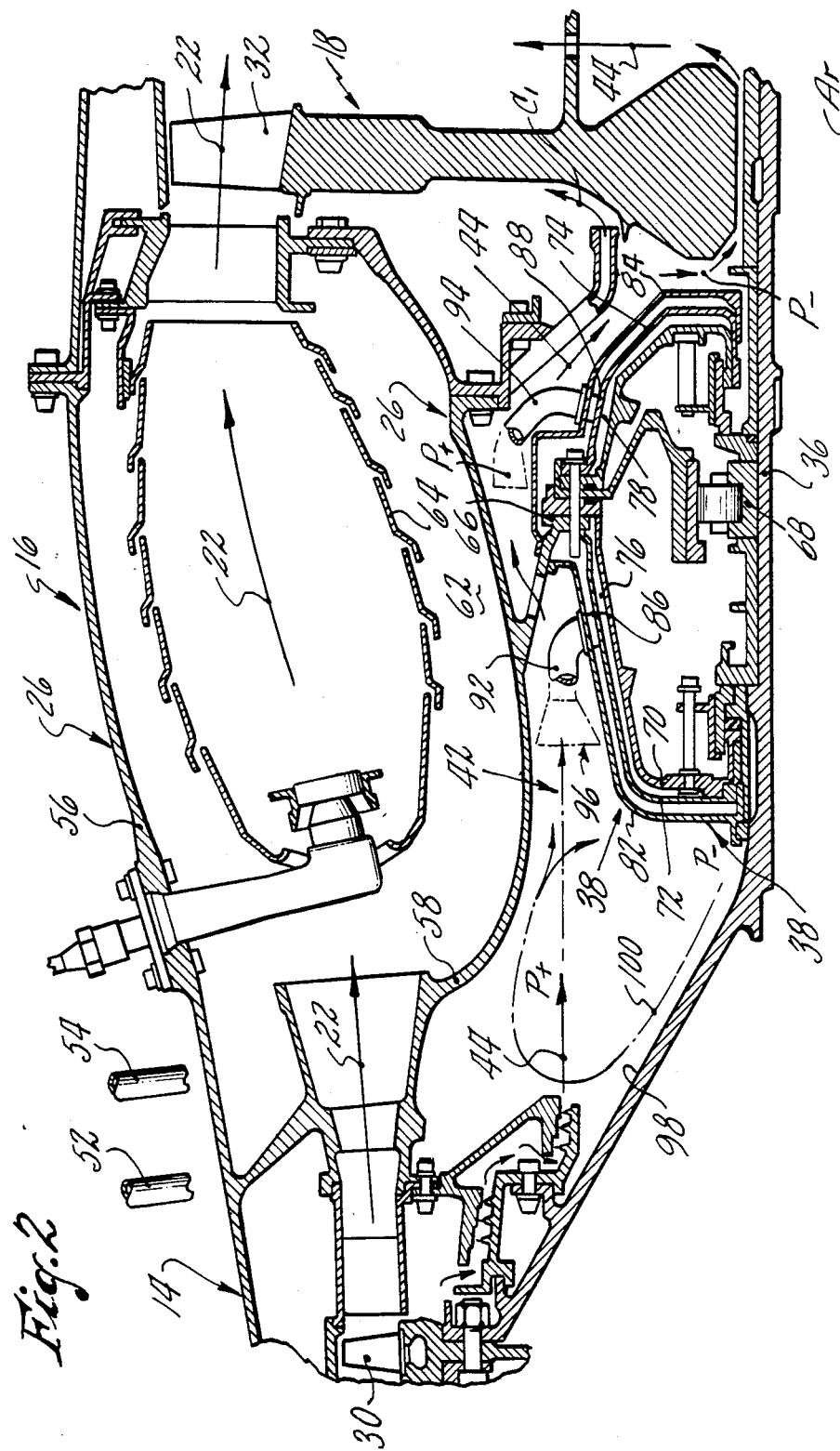
FIG. 2 is a cross-sectional view of a portion of the compression section, combustion section and turbine section of the engine showing one embodiment of the present invention and a second embodiment in phantom.

FIG. 2 is an enlarged cross-sectional view of a portion of the compression section 14, the combustion section 16 and the turbine section 18. The first duct 52 and the second duct 54 are broken away for clarity.

The stator assembly 26 includes an outer case 56 which extends circumferentially about the axis of rotation $A_r$. An inner diffuser case 58 extends radially inwardly from the outer case. The inner diffuser case divides the interior of the engine into the inner annular cavity 42 and an outer annular cavity 62. An annular combustion chamber 64 extends circumferentially to define a combustion zone for fuel in the outer cavity. The primary flow path 22 for hot working medium gases extends rearwardly from the rearmost rotor stage 30 of the compressor 14 through the combustion chamber, and thence to the high pressure turbine section. In the turbine section, the flow path passes through the first rotor stage 32 and the second rotor stage 34 (not shown).

An annular strut 66 extends radially inwardly from the inner diffuser case across the inner cavity 42 and the flow path 44. A bearing 68 disposed in the bearing compartment extends between the strut and the rotor shaft 36. The bearing compartment housing 38 extends circumferentially about the bearing to protect the bearing and to confine any lubricants which are sprayed on the bearing to the bearing compartment. The bearing housing 38 includes a casing 70 which extends circumferentially about the bearing. A first shield 72 and a second shield 74 are spaced axially from the casing leaving a first annular manifold 76 and a second annular manifold 78 therebetween. A heat shield 82 and a heat shield 84 are spaced axially from the first and second shields to leave a dead air space therebetween.

The first and second annular manifolds are adapted by openings 86,88 to receive air from the duct 54. The duct 54 terminates in a first pipe 92 and a second pipe 94 which are in flow communication with these openings.

An alternate embodiment 96 is shown in phantom and is explained in more detail with reference to FIG. 4. The alternate embodiment does not employ a duct 54 to bring pressurized cooling air to the bearing compartment. Instead, the rotor shaft 36 has a radially extending surface 98 as shown in FIG. 2 which bounds the inner cavity. Rotation of the shaft about the axis of rotation at speeds which may exceed nine thousand revolutions per minute accelerates the air in the cavity to velocities greater than one hundred feet per second. The circulation pattern 100 of working medium gases in the cavity creates a region of high pressure P+ in the cavity with respect to a region of low pressure P−.

Figure 3:
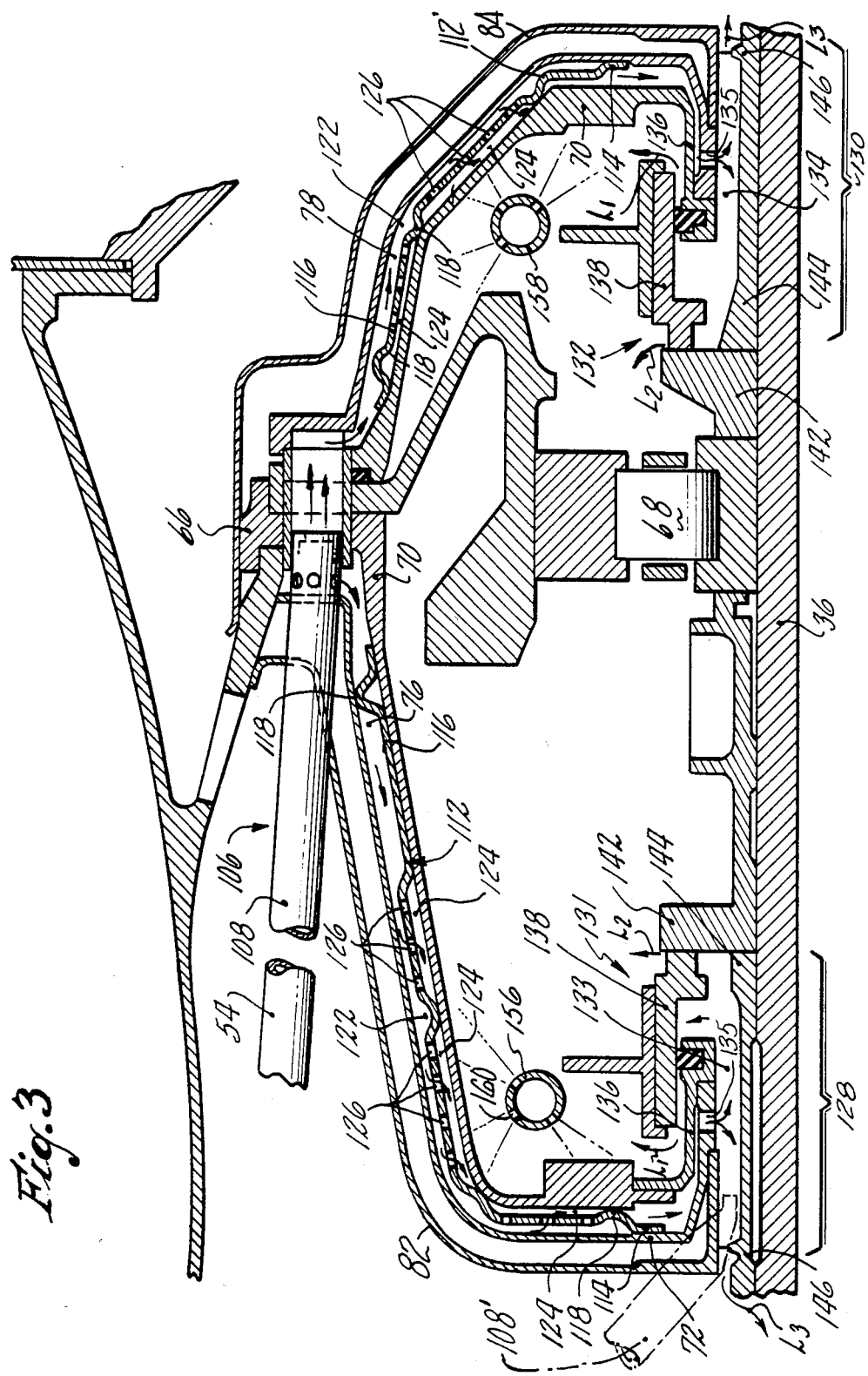
FIG. 3 is an enlarged view of a portion of the engine shown in FIG. 2 and illustrates a third alternate embodiment.

FIG. 3 is an alternate embodiment of the bearing housing 38 and shows a bearing housing 106 having a plurality of pipes 108 in flow communication with the second duct 54. Each pipe is connected to the first annular manifold 76 and the second annular manifold 78. An impingement plate 112 extends circumferentially in the first annular manifold. The impingement plate has a first end 114 pressed against the first shield 72 and has a second end 116 adjacent the pipe 108. Local stand off projections 118 space the impingement plate from the shield leaving a supply region 122 therebetween. The supply region is in flow communication at the second end with the plurality of cooled, pressurized air pipes 108. The projections also space the impingement plate from the annular casing 70 leaving an impingement region 124 therebetween. A plurality of holes 126 extend through the impingement plate to place the supply region in flow communication with the impingement region. A second impingement plate 112' may be disposed in the second annular manifold 78. The same numbers are used to refer to parts of the second impingement plate as are used for parts having a like function on the first impingement plate.

The bearing housing has a first end 128 and a second end 130. A first seal means 131 is located at the first end and a second seal means 132 is located at the second end. The bearing housing is spaced radially from the rotor assembly at the first end leaving a first annular buffer cavity 133 therebetween adjacent the first seal means. The bearing housing is also spaced radially from the rotor assembly at the second end leaving a second annular buffer cavity 134 therebetween adjacent the second seal means. Each buffer cavity is in flow communication with the duct 54 through an associated manifold and a plurality of circumferentially spaced holes 135 in the housing or alternatively, as shown in phantom, the duct 54 might supply cool air directly to the buffer cavities through a plurality of pipes 108'.

In the embodiment shown, the first seal means defines a portion of the first buffer cavity and the second seal means defines a portion of the second buffer cavity.

Each seal means includes a seal support structure 136, and a carbon seal ring 138 which is urged by a spring (not shown) against an adjacent rotor structure, such as the seal plate 142. A seal element 144 extends circumferentially and is attached to the rotor shaft 36. The seal element has a circumferentially extending knife 146 which extends radially outwardly from the sealing element into proximity with a portion of the housing, such as the heat shield 82 or the heat shield 84.

The interior of the bearing compartment is supplied with oil to lubricate the bearing 68 via a supply line (not shown) which sprays oil on the bearing. The oil serves to cool the bearing and is at a temperature much below the temperature of the inner cavity. A return line (not shown) drains oil from the bottom of the bearing compartment and circulates the oil to a heat exchanger in heat transfer communication with the engine fuel. In addition, a supplementary source of oil may be provided, such as oil spray pipes 156 and 158. These pipes have holes 160 for spraying the oil on interior surfaces of the casings which are adjacent to the impingement regions 124 and other interior surfaces of the casing adjacent to regions requiring extra cooling.

Figure 4:
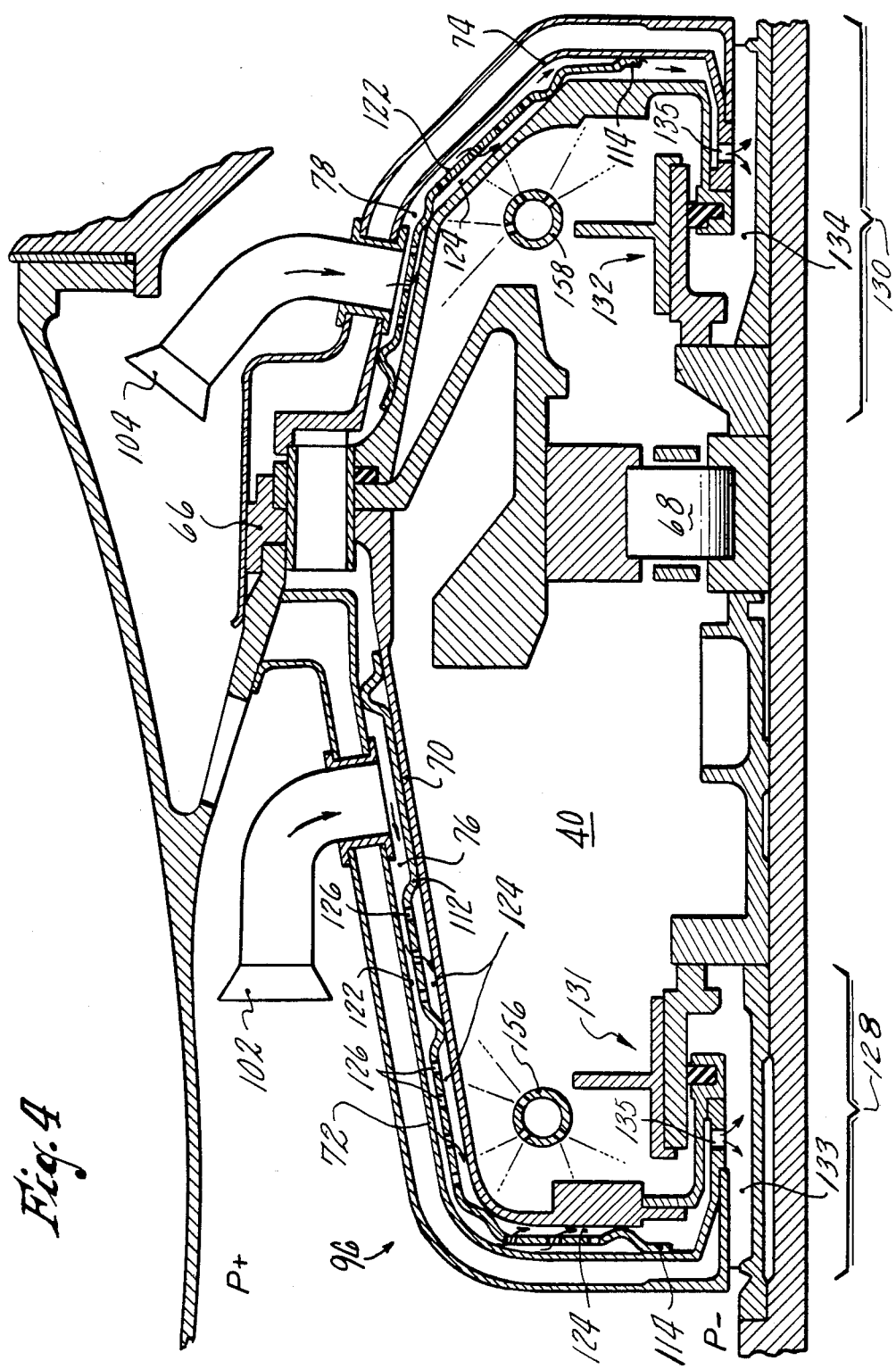
FIG. 4 is an alternate embodiment of the construction in FIG. 2 as shown in phantom in FIG. 2.

FIG. 4 is the alternate embodiment mentioned in the discussion of FIG. 2 and shows a housing 96 employing a plurality of first scoops 102 and a plurality of second scoops 104 alligned with the approaching flow to capture and duct air from the second region P+ of the inner cavity to the annular manifolds 76 and 78. The air as it enters the manifold is at a higher static pressure than the pressure in the region designated by P−.

Figure 5:
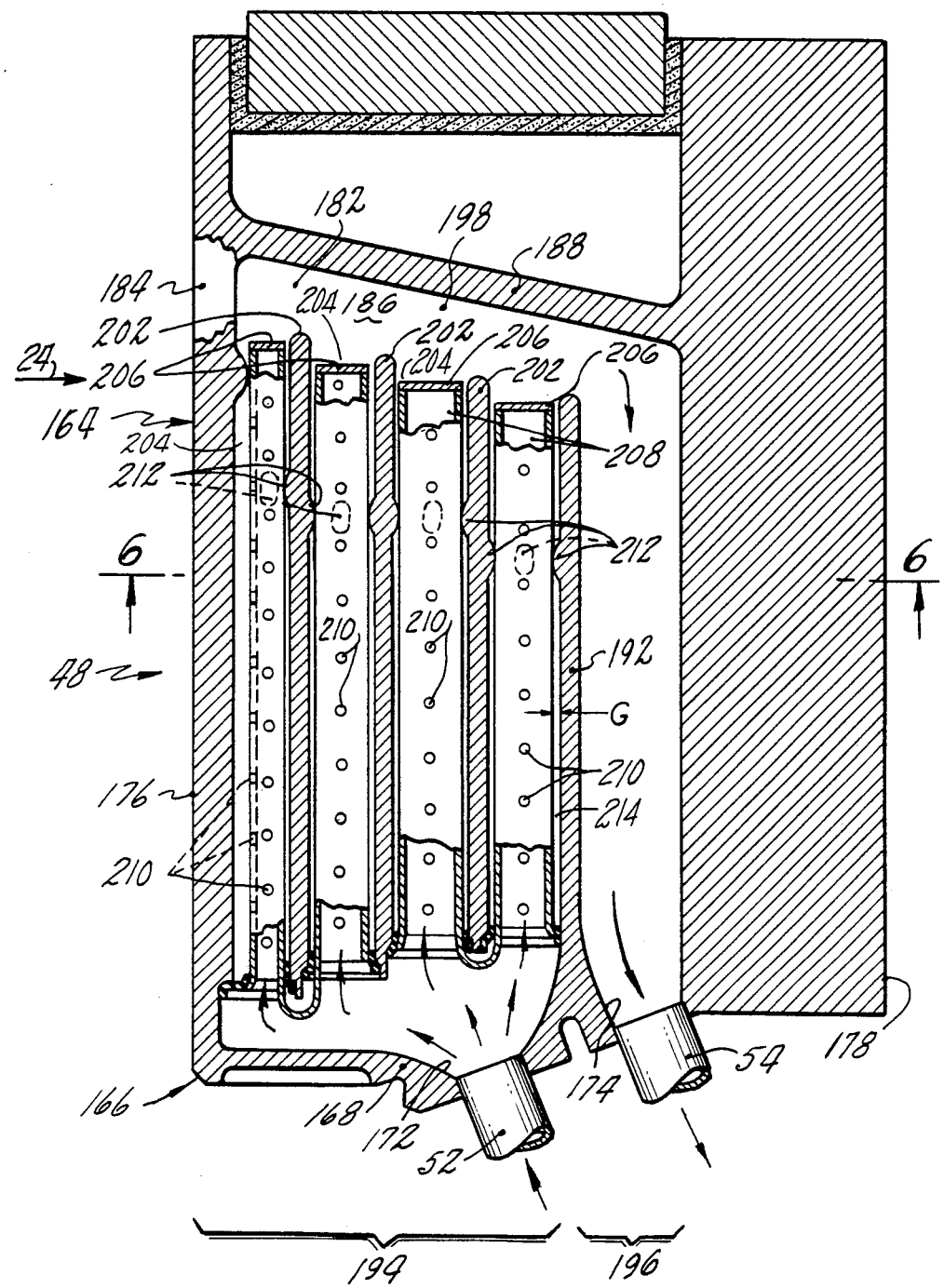
FIG. 5 is a side elevation cross-sectional view of the pressure containment heat exchanger located in the fan compartment of the engine.

FIG. 5 is an enlarged side elevation view of the heat exchanger 48. The heat exchanger extends radially across the secondary flow path 24 for working medium gases. The heat exchanger has an airfoil shape formed by the airfoil section 164. A base section 166 has a chordwisely extending base wall 168. A first duct 172 in the base wall adapts the heat exchanger to be in flow communication through the base wall with a source of hot, pressurized gases such as the first duct 52. The duct 52 which is in flow communication with the rearmost stage of the high pressure compressor. The gases flowed through this duct are at a pressure which will exceed two-hundred and fifty pounds per square inch absolute ($Pd \geq 250$ psia) and are at a temperature well in excess of eight hundred degrees Fahrenheit (800° F.). A second duct 174 adapts the heat exchanger to be in flow communication through the base wall with an exhaust duct, such as the second duct 54. The exhaust duct is in flow communication with the annular buffer cavities 133,134 adjacent the bearing compartment of the engine.

The airfoil section includes a leading edge 176, a trailing edge 178 and a first sidewall 182. A second sidewall 184 is joined to the first sidewall at the leading edge and the trailing edge. The second sidewall is spaced from the first sidewall to form a cavity 186 therebetween. A tip wall 188 extends in a chordwise direction between the first sidewall and the second sidewall.

A first baffle 192 extends in the spanwise direction from the base wall 168 to divide the cavity 186 into a front portion 194 and a rear portion 196. The first baffle is spaced from the tip wall leaving a turning passage 198 therebetween. The rear portion 196 is in flow communication with the exhaust duct 174.

A plurality of second baffles 202 are disposed in the front portion 194 of the cavity 186. The second baffles extend in the spanwise direction and are chordwisely spaced one from the other leaving a plurality of spanwisely extending passages 204 therebetween one of which is adjacent the leading edge region 176. A plurality of impingement tubes 205 are disposed in the front portion 194 of the airfoil. Each tube is disposed in an associated passage. Each tube has an interior 208 which is in flow communication with the duct 52 for hot pressurized gases. A plurality of holes 210 extend through the walls of the impingement tube for directing impingement flow against the sidewalls of the airfoil and, in the case of the leading edge tube, against the leading edge region of the airfoil. In alternative constructions, the hot air may be directed against the baffles 202.

Each impingement tube 206 is spaced chordwisely from the baffles 202 and chordwisely from the side walls 182, 184 by local stand off projections 212 leaving an impingement gap G therebetween. The impingement gap extends spanwisely to leave an annular flow passage 214 about each tube which is in flow communication with the turning passage 198.

Figure 6:
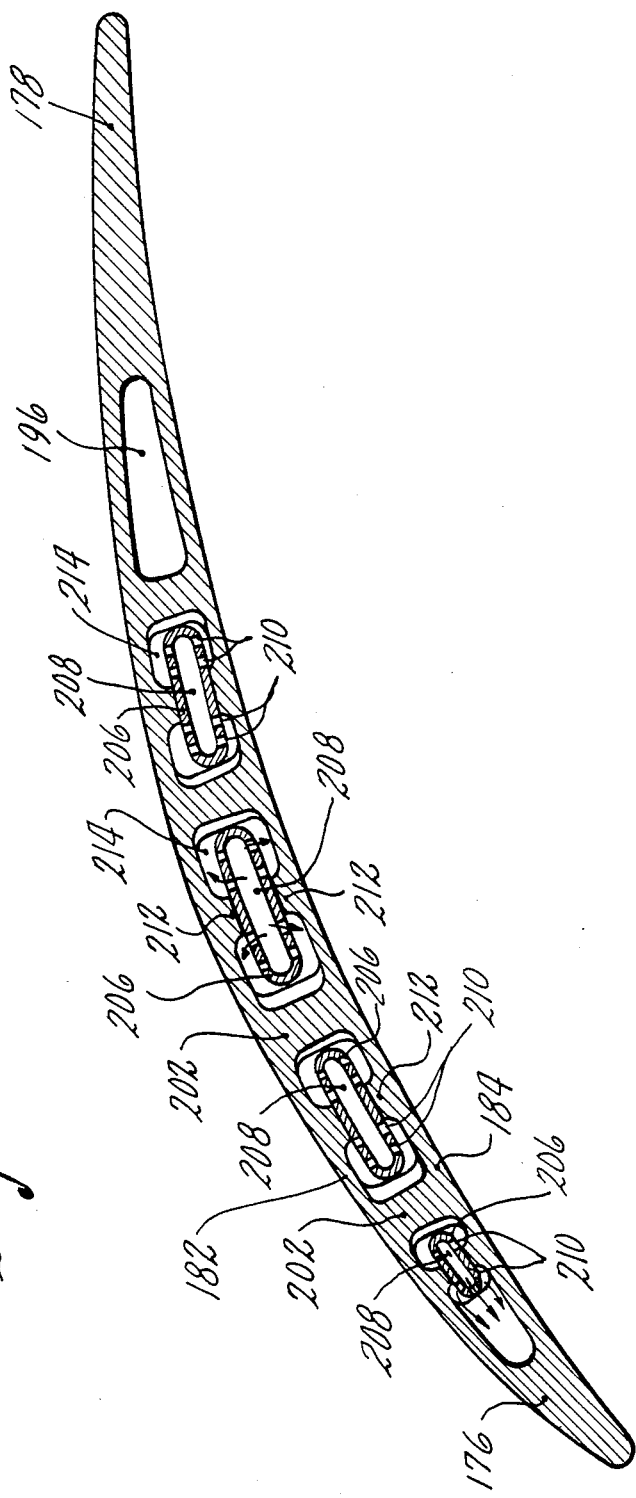
FIG. 6 is a cross-sectional view taken along the line 66 of FIG. 5.

FIG. 6 is an enlarged cross-sectional view of the heat exchanger 48 taken along the lines 6—6 of FIG. 5 showing the relationship of the impingement tubes 206, to the sidewalls 182, 184 and the baffles 202. As shown, the stand off 212 extend from the sidewalls and the baffles to the tubes to form the annular flow passage 214.

Figure 7:
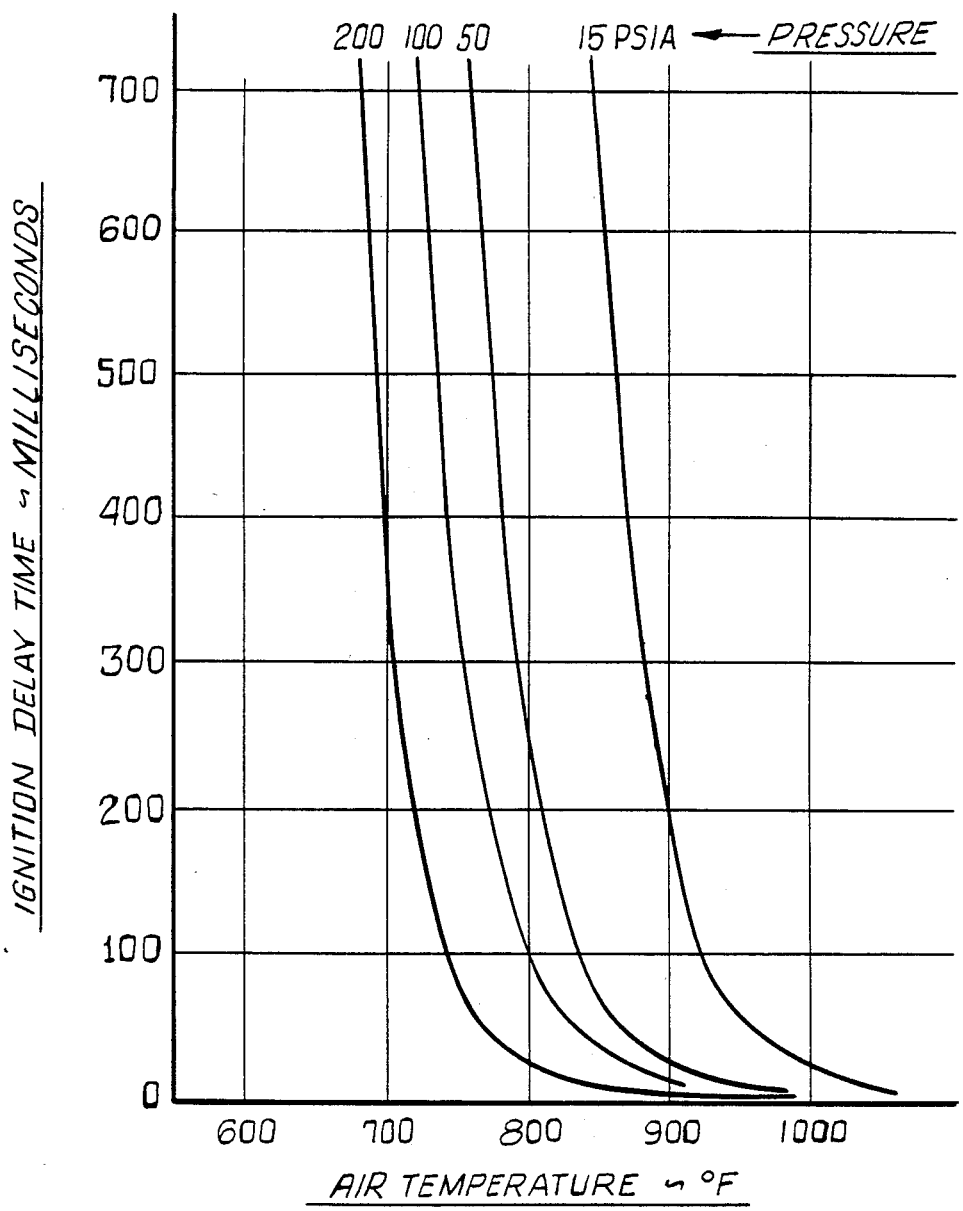
FIG. 7 is a graphical representation of the ignition delay time (auto ignition time characteristic) versus the temperature of the oil and air mixture as a function of several different pressures.

FIG. 7 is a graphical representation of the ignition delay time in milliseconds (autoignition time characteristic) of an oil and air mixture as a function of temperature in degrees Fahrenheit. As can be seen, the autoignition time characteristic decreases with increases in temperature and pressure.

During operation of the gas turbine engine 10, working medium gases are flowed along the primary flow path 22 and the secondary flow path 24. As the gases are flowed along the primary flow path, the gases are compressed in the fan and compressor sections, and burned with fuel in the combustion section to add energy to the gases by heating them. The hot, pressurized gases are exhausted through the turbine section to produce thrust and to produce useful work by driving the rotor assembly about its axis of rotation $A_r$. The temperature of these gases may approach two thousand degrees Fahrenheit and their pressure may exceed two-hundred pounds per square inch.

The arrays of coolable rotor blades which extend into the working medium flow path, such as the rotor blades 32 and the rotor blades 34 are bathed in the hot working medium gases and gain heat from the gases. The blades are cooled by flowing pressurised cooling air through the blades and into the working medium flow path. The cooling air is pressurized to a high pressure to exceed the high pressures of the working medium gases in the high pressure turbine section of the flow path. A suitable source of cooling air for the pressurized cooling of blades in the high pressure turbine section is the discharge region of the rearmost high pressure compressor rotor stage, rotor stage 30 of the high pressure compressor.

Pressurized cooling air for the first stage rotor blade is supplied via cooling air flow path $C_1$. Cooling air for the second stage rotor blade is supplied at a pressure slightly less than the first stage but still very high because of the closeness of the second stage rotor in the flow path to the last stage of the high pressure compressor. Rotor stage 30 is also a satisfactory source of the cooling air for the second stage rotor blade 34. Cooling air for these purposes is diverted from the primary flow path to the annular inner cavity 42 along the flow path 44. The cooled air is flowed by the bearing compartment and through the bore of the first rotor stage 32 to the second stage rotor blades. Although the high pressure air acts as moderate pressure cooling air to the rotor blades (which may see gas path temperatures approaching two thousands degrees Fahrenheit and pressures slightly lower than the air), the temperature of the air exceeds eight hundred degrees Fahrenheit and the pressure will exceed two hundred pounds per square inch absolute.

With respect to the interior of the bearing compartment 40 which will operate at temperatures less than four hundred degrees Fahrenheit and at much lower pressures than the pressure of inner cavity, the cooling air flowed along flow path 44 is hot, high pressure air. The effectiveness of the first seal means 131 and the second seal means 132 rapidly decreases as the pressure across the seal begins to exceed one hundred pounds per square inch, absolute. As a result, the bearing compartment is operated at a pressure in excess of one hundred pounds per square inch to ensure the pressure across the seals does not exceed one hundred pounds per square inch. As shown in FIG. 7, air leaking along a leak path $L_1$ or $L_2$ into the oil and air mixture in the bearing compartment at a temperature of eight hundred degrees Fahrenheit will cause autoignition within one hundred milliseconds of entry of the air into the compartment, providing the leakage air cannot be mixed with the cooler environment of the bearing compartment which is approximately three hundred degrees Fahrenheit. At special running conditions of the engine, for example sea level takeoff operation, the temperature of the air in the inner cavity may approach nine hundred degrees Fahrenheit and, the time for autoignition is in the order of five milliseconds.

Accordingly, local regions of the engine adjacent the seal means 131, 132 are provided with lower temperature air. For example, the first buffer cavity 133 and the second buffer cavity 134 are placed in flow communication with a source of air having a static pressure higher than the local static pressure of the air in the inner cavity adjacent the seal means to prevent the air in the inner cavity from flowing into the seal means. The buffer air is provided at a sufficient flow rate such that all the leakage air is supplied by the pressurized air and the air is cooled to an extent that prevents autoignition when the air leaks into the chamber. In this regard, the most conservative mode of operation is to determine the time to autoignition, that is, the autoignition characteristic of the leaking air. Next, determine the greatest amount of time the leakage air will spend in the bearing compartment before it is fully mixed with the lower temperature, air/oil mixture in the bearing compartment, that is, the quench time characteristic. Then cool the buffer air until the pressurized air has an autoignition time characteristic that is greater than the quench time characteristic. An even more conservative mode of operation is to assume the time for complete mixing is the shortest residence time of the air in the bearing compartment and depends on the flow rate of the air and oil mixture through the bearing compartment. The time in the compartment is the residence time characteristic of the compartment.

Thus, in using this method of operation which enables the bearing compartment 40 to operate in a hot, high pressure environment, pressurized air is supplied to a buffer region, such as the buffer cavities 133, 134, at a static pressure which is greater than the local static pressure in the inner air cavity and at a temperature low enough such that the autoignition characteristic of the supplied buffer air is greater than the quench time characteristic or the residence time characteristic of the air as it leaks into the bearing compartment along leak paths, such as leak paths $L_1$ and $L_2$.

One source of pressurized air is the high pressure compressor section of the engine. However, the air is at an elevated temperature. As shown in the embodiments illustrated in FIG. 1, FIG. 2 and FIG. 3, a portion of the high compressor air (at a flow rate which at least satisfies the seal leakage at the first seal means and the second seal means when the air is delivered to the buffer cavities) is ducted away from the compressor flow path and flowed via the duct 52 to the heat exchanger 48. The hot, pressurized air enters the heat exchanger. The heat exchanger takes advantage of the high pressure of the air by ducting the air to impingement tubes 206 and impinging the flow on the side walls and on the leading edge 176 of the airfoil shaped heat exchanger. The impingement flow greatly increases the conductive and convective heat transfer mechanisms and is an efficient way to cool the air by the transfer of heat from the air to the walls of the heat exchanger. The fan bypass air, rushing over the exterior surfaces of the airfoil 176, gains heat from the gases increasing the energy content of the air as it is exhausted to provide secondary thrust to the engine. A particular advantage of this type of heat exchanger is the thinness of the boundary layer that exists on the leading edge region of the airfoil and the front portion of the sidewalls which permits turbulent heat transfer between the side walls and the fan air. A similar impingement tube heat exchanger might be placed on the side of the duct as shown in phantom by the heat exchanger 48'. In such a case, one wall of the heat exchanger would be in direct heat transfer communication with the flowing working medium gases. Alternatively, a heat exchanger might employ the high pressure hot air for convective heat transfer by using the high pressure to force air through annular channels having a large hydraulic diameter such as the channels 214.

The difference in pressure between the heat exchanger 48 and its environnent will exceed two hundred pounds per square inch absolute which requires the heat exchanger to act as both a heat exchanger and a pressure containment vessel. An advantage in this regard is the curved side walls of the heat exchanger which resist pressure with both tensile stresses (side wall 182) and compressive stresses. These curved walls are used in combination with the rigid web-like plates, extending between the plates, such as the baffle 192, and the baffles 202. Thus, the baffles serve the twin purpose of guiding the flow within the heat exchanger and holding the heat exchanger together.

The impingement tubes also serve a twin purpose, one of which aids the ability of the airfoil to contain the pressurized gases: first, the tubes direct the impingement flow and form the convective heat transfer passages; and, secondly, the tubes act as an inner pressure containment vessel for receiving the pressurized air within the outer containment vessel formed by the sidewalls 182,184. Another advantage of the fan duct as a location for cooling the hot, pressurized air is the absence of combustible vapors. In the event that supply duct 52 or heat exchanger 48 develops a leak, the leaking gases having the potential for a small autoignition characteristic are swept away and out of the engine by the working medium gases in the secondary flow path.

After the heat exchanger 48 has cooled the air, the cooled air is returned via the second duct 54 to the engine interior. The cooled air is either flowed directly to the first and second buffer cavities 133, 134 as shown in phantom in FIG. 3; or, the cooled air is flowed to the first annular manifold 76 and the second annular manifold 78 and thence to the first buffer cavity and the second buffer cavity. As the air is flowed through the manifolds, heat is lost to the interior of the bearing compartment further cooling the air before it reaches the buffer cavities. As shown in FIG. 3, the further cooling of the air is promoted by impinging the air through the impingement plates 112 on the surfaces of the casing 70. Cooling of the air is further promoted by impinging oil on the casing with the spray pipes 156, 158. Even without the impingement plate, and without the sprayed oil, experiments have shown that the temperature of the buffer air can be lowered to less than seven hundred degrees Fahrenheit by the use of the heat exchanger alone in the fan duct.

The amount of air used to supply the buffer air cavities with at least enough air to replace the air lost to leak paths $L_1$, $L_2$, and $L_3$ is small in comparison to constructions which might use large volumes of air to purge the interior of the bearing compartment 40 or to completely buffer the entire compartment. Nevertheless, this buffer air is air diverted from the working medium flow path to a flow path that does not produce useful work. And, although the heat exchanger in the fan duct is small, and is aerodynamically contoured, the heat exchanger does represent an intrusion into the aerodynamic flow path 24 of the engine.

The bearing compartment 40 shown in phantom and in FIG. 4 is not connected to a heat exchanger external of the working medium flow path nor are additional gases bled directly from the working medium flow path. Instead, a portion of the hot cooling air from the inner annular cavity 42 is ducted away from the high pressure region P+ of the cavity through scoops 102, 104. The scoops convert a substantial portion of the velocity pressure of the air and thus a substantial portion of the total pressure of the air to static pressure. As a result, air from the inner cavity 42 is flowed as is air in the FIGS. 1-3 embodiments to the annular manifolds 76,78 and thence to the buffer cavities 133, 134. As with the embodiments shown in FIGS. 1-3 cooling, of the buffer air may be increased by impingement plates 112 and by oil impinged on the surface of the casing adjacent the impingement regions 124. Experiments have shown that a satisfactory amount of cooling of the buffer air may be provided by flowing the inner cavity air in the annular manifold without an impingement plate and without special pipes to spray oil on the inside of the casing.

The thermal capacitance of the bearing compartment is large relative to the amount of heat removed from the air being flowed to the buffer cavities and gained by mass flow from the buffer cavities via the first leak paths $L_1$ and the second leak paths $L_2$. As a result, only a small increase in the temperature of the oil results from cooling of the buffer air and does not result in degradation in the performance of the engine. In fact, this heat may be rejected to fuel going to the combustion chamber through an engine fuel/engine oil cooler and thus is returned to the primary working medium flow path.

Although the invention has been shown and described with respect to detailed embodiments thereof, it should be understood by those skilled in the art that various changes in form and detail thereof may be made without departing from the spirit and the scope of the claimed invention.

I claim:

1. A method for operating gas turbine engine having a compression section, a turbine section, an annular flow path for working medium gases which extends through the sections of the engine, a rotor assembly and a stator assembly, the engine further including a bearing housing which defines a bearing compartment in an inner cavity of the engine, a bearing disposed in the bearing compartment for supporting the rotor assembly, sealing means which extends from the housing into proximity with the rotor assembly, and a buffer region adjacent the sealing means, the improvement which comprises:

flowing cooling air from the compression section through the inner cavity at pressures in excess of two-hundred pounds per square inch to the turbine section of the engine for cooling rotor blades in the turbine section;

pressurizing the bearing compartment to a pressure in excess of one-hundred pounds per square inch to establish a difference in pressure across the sealing means which is less than a predetermined amount;

flowing a lubricant to the bearing compartment and flowing a lubricant and air mixture from the bearing compartment at a flow rate which establishes a quench time characteristic for the lubricant and air mixture in the compartment;

pressurizing buffer air in a region of the engine;

flowing the pressurized buffer air to a buffer region adjacent the sealing means at a static pressure which is greater than the static pressure of the cooling air in the inner cavity adjacent the buffer region and greater than the static pressure of the bearing compartment under normal operative conditions;

cooling the buffer air before the buffer air reaches the buffer air region to a temperature which establishes an autoignition time characteristic for the buffer air as the air passes through the sealing means into the bearing compartment which is greater than said quench time characteristic.

2. The method of operating a gas turbine engine of claim 1 wherein the lubricant/oil mixture has a residence time characteristic and wherein the step of cooling the buffer air establishes an autoignition time characteristic which is greater than said residence time characteristic and said quench time characteristic.

3. The method for operating a gas turbine engine as claimed in claim 1 wherein the engine has a manifold in heat transfer communication with the interior of the bearing compartment and wherein the step of cooling the buffer air includes the step of flowing buffer air through the manifold to transfer heat from the buffer air to the lubricant and air mixture in the bearing compartment.

4. The gas turbine engine as claimed in claim 2 wherein the means for forming an annular buffer cavity is the housing which is spaced from the rotor assembly leaving a buffer cavity therebetween.

5. The method for operating a gas turbine engine as claimed in claim 4 wherein the step of pressurizing the buffer air includes the step of flowing cooling air to a rotating surface which extends radially in the inner cavity to accelerate the air in the radial direction and wherein the step of flowing the pressurized air to the buffer region includes the step of ducting the radially accelerated air to the manifold for buffer air.

* * * * *